(12) United States Patent
Stemmle et al.

(10) Patent No.: US 8,798,697 B2
(45) Date of Patent: Aug. 5, 2014

(54) ARRANGEMENT WITH A SUPERCONDUCTIVE ELECTRICAL DIRECT CURRENT CABLE SYSTEM

(75) Inventors: Mark Stemmle, Hannover (DE); Erik Marzahn, Langenhagen (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 13/558,608

(22) Filed: Jul. 26, 2012

(65) Prior Publication Data
US 2013/0190183 A1 Jul. 25, 2013

(30) Foreign Application Priority Data
Jul. 28, 2011 (EP) ..................................... 11305984

(51) Int. Cl.
*H01L 39/14* (2006.01)
(52) U.S. Cl.
USPC ......................................................... 505/231
(58) Field of Classification Search
USPC ............... 505/230, 231, 232, 163; 174/125.1
See application file for complete search history.

(56) References Cited

U.S. PATENT DOCUMENTS

| | | | | |
|---|---|---|---|---|
| 3,414,662 | A | * 12/1968 | Klein et al. | ................... 174/15.5 |
| 3,754,095 | A | * 8/1973 | Aupoix et al. | ............. 174/126.2 |
| 2010/0179064 | A1* | 7/2010 | Willen et al. | ................. 505/230 |
| 2010/0227764 | A1* | 9/2010 | Willen et al. | ................. 505/163 |

FOREIGN PATENT DOCUMENTS

WO 2008148390 12/2008

* cited by examiner

*Primary Examiner* — Colleen Dunn
(74) *Attorney, Agent, or Firm* — Sofer & Haroun, LLP

(57) ABSTRACT

An arrangement with a superconductive electrical direct current cable system is specified which includes at least one direct current transmission element (4) composed of two phase conductors which are insulated relative to each other, and a cryostat suitable for conducting a cooling agent, in which the direct current cable system is arranged. The cryostat is composed of at least one metal pipe which is surrounded by a circumferentially closed layer with thermally insulating properties. Each of the two phase conductors (5,6) is composed of several superconductive elements (9) which are combined into a unit. Between the two phase conductors (5,6) is mounted a separating layer (7) of insulating material, and the two phase conductors (5,6), including the separating layer (7) are surrounded by a sheath (8) of insulating material for forming a direct current transmission element (4).

6 Claims, 1 Drawing Sheet

ARRANGEMENT WITH A SUPERCONDUCTIVE ELECTRICAL DIRECT CURRENT CABLE SYSTEM

RELATED APPLICATION

This application claims the benefit of priority from European Patent Application No. 11 305 984.4, filed on Jul. 28, 2011, the entirety of which is incorporated by reference.

BACKGROUND

1. Field of the Invention

The invention relates to an arrangement with a superconductive electrical direct current cable system which includes at least one direct current transmission element composed of two phase conductors which are insulated relative to each other, and a cryostat suitable for conducting a cooling agent in which the direct current cable system is arranged, and which is composed of at least one metal pipe which is completely circumferentially surrounded by a closed layer with thermally insulating properties (WO 2008/148390 A1).

2. Description of the Related Art

In today's technology, superconductive cables include electrical conductors of a composite material which includes ceramic material which, at sufficiently low temperatures, changes into the superconductive state. The electrical direct current resistance of an appropriately constructed conductor is zero with sufficient cooling, as long as a certain voltage is not exceeded. Suitable ceramic materials are, for example, BSCCO (bismuth-strontium-calcium-copper-oxide) as materials of the first generation, or REBCO (Rare-earth-barium-copper-oxide), particularly YBCO (Yttrium-barium-copper-oxide) as materials of the second generation. Sufficiently low temperatures for placing such material into the superconductive state are, for example, between 67K and 90K. Suitable cooling agents are, for example, nitrogen, helium, neon and hydrogen, or mixtures of these materials.

A superconductive direct current cable can be used, for example, as current supply cable on ships, or as connecting cable between points of intersection within a transmission network, or also as connecting cable between different transmission networks. This may be, for example, an arrangement for a high voltage direct current transmission (HGÜ) which can be used for bridging long distances, for example, as sea cables. In comparison to superconductive alternating current cables, superconductive direct current cables have the advantage that no electrical alternating current losses occur. In addition, the direct current cables are not subject to charging currents and no undesired inductive voltage drops occur.

The above mentioned WO 2008/148390 A1 discloses a two phase electrical cable for supplying users with electrical current. It is constructed as a superconductive cable with two phase conductors which are coaxially combined into a unit, and are separated from each other by an inner dielectric. The cable is arranged in a cryostat, which is composed of two concentric pipes between which a vacuum insulation is placed. The cooling agent for producing the superconductive state of the phase conductors is conducted through the cryostat. Cooling of such a cable can be problematic because, for cooling of the superconductive phase conductors, the dielectric may constitute a thermal insulation.

OBJECTS AND SUMMARY

It is the object of the invention to simplify the construction of the above-described arrangement.

In accordance with the invention, this object is met in that
- each of the two phase conductors is composed of several superconductive elements combined into a unit,
- between the two phase conductors a separating layer of insulation material is mounted, and
- the two phase conductors, including the separating layer, are surrounded by a sheath of insulation material to form a direct current transmission element.

A direct current transmission element of this arrangement is of simple and compact construction. Each phase conductor of such a phase component consists of a plurality of superconductive elements, which are only surrounded by a sheath of insulation material, so that the superconductive elements and the respective phase conductors are directly cooled by a cooling agent conducted through the cryostat. The number of direct current transmission elements to be arranged in a cryostat is variable in dependence on the inner width of the cryostat, so that the arrangement can be adapted in a simple manner to different voltages, with a correspondingly variable need of superconductive material. The construction of the arrangement can be changed in a modular manner by using a different number of direct current transmission elements arranged in the cryostat. They are thermally insulated altogether by the cryostat.

BRIEF DESCRIPTION OF THE DRAWINGS

Embodiments of the subject matter of the invention are illustrated in the drawing.

In the drawings

DETAILED DESCRIPTION

Figure 1:
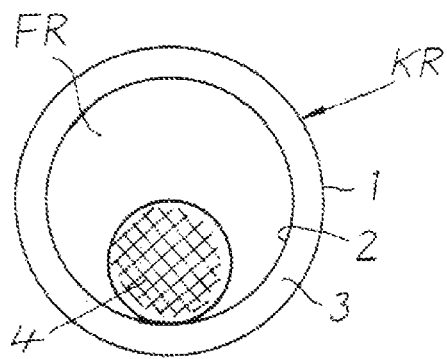
FIG. 1 shows an arrangement according to the invention in a purely schematic illustration.

In the embodiment of the arrangement according to FIG. 1, a cryostat. KR is composed of two metal pipes 1 and 2 which are arranged coaxially relative to each other and between which a vacuum insulation 3 is placed. The cryostat KR could also be of a different construction if it is ensured that the space surrounded by the cryostat is efficiently protected against heat entering from the outside. In the cryostat KR a direct current transmission element 4—in the following called "GÜ 4" for short—is arranged whose more precise construction is shown, for example, in FIGS. 2 and 3.

The GÜ 4 leaves, relative to the inner pipe 2 of the cryostat KR, a free space FR for conducting a cooling agent therethrough.

Figure 2:
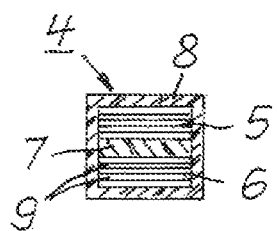
FIGS. 2 and 3 show two different embodiments of a direct current transmission element usable in the arrangement.

According to FIG. 2, a GÜ 4 consists, for example, of two phase conductors 5 and 6 which are also insulated relative to each other. The two phase conductors 5 and 6 can have different polarities during operation of the arrangement, or can be connected to a polarity and ground. The unit composed of phase conductors 5 and 6 and a separating layer 7, is surrounded by a sheath 8 of insulating material. The sheath 8 not only holds the two phase conductors 5 and 6 in their positions, but it also insulates the GÜ 4 relative to the cryostat KR.

Figure 3:
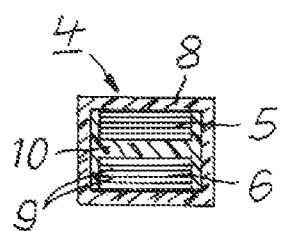

Each phase conductor 5 or 6 is composed of several superconductive elements which, as shown in FIGS. 2 and 3, are constructed as flat strips 9. However, it would also be possible, for example, to use round wires as superconductive elements.

In an embodiment of the GÜ 4 shown in FIG. 3, instead of the simple separating layer 7, an H-shaped spacer member 10 is used which has two chambers located one opposite the other, in which the superconductive elements, here the strips 9, are arranged. The sheath 8 then also encloses the spacer member 10 with the superconductive elements placed in the sheath.

According to FIG. 1, at least one GÜ 4 is arranged in the cryostat KR. The number of GÜ 4 to be mounted in a cryostat depends essentially on the magnitude of the voltage to be transmitted, however, as already mentioned, the number of GÜ 4 depends on the size of the free space FR.

Figure 4:
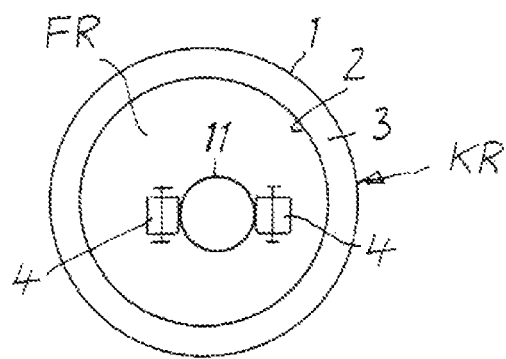
FIG. 4 shows the arrangement according to the invention in a more precise embodiment as compared to FIG. 1.

At least one GÜ 4 can be wound helically within the cryostat KR about an elongated support 11, as shown in FIG. 4. The support 11 is, for clarity's sake, shown in FIG. 4 as "freely levitating." During operation of the arrangement, the support rests together with the GÜ 4 wound around the support, against the inner pipe 2 of the cryostat KR. In the embodiment depicted in FIG. 4, two GÜ 4 are illustrated wound helically around the support 11. The support 11 can be a solid strand or also a pipe which can serve for returning a cooling agent moved through the free space FR of the cryostat KR. The material of the support 11 must be stable at the low temperatures of the cooling agent used during operation. A corresponding temperature is, according to the above discussion, for example, between 67K and 90K. A suitable material is, for example, polytetrafluoroethylene. However, the support 11 may also consist of metal, for example, high grade steel.

The invention claimed is:

1. Arrangement with a superconductive electrical direct current cable system comprising:

at least one direct current transmission element composed of only two phase conductors units which are insulated relative to each other, wherein each of the two phase conductors units is composed of several superconductive elements, a separating layer of insulating material is mounted between the two phase conductors units, within each of said direct current transmission element, the two phase conductors, including the separating layer, are surrounded by a single sheath of insulating material for forming said direct current transmission element, and a cryostat suitable for conducting a cooling agent, wherein the cryostat is composed of at least one metal pipe which is surrounded by a circumferentially closed layer with thermal insulating properties, and wherein said phase conductors units are directly cooled by the cooling agent conducted through said cryostat.

2. The arrangement according to claim 1, wherein the superconductive elements are flat strips.

3. The arrangement according to claim 1, wherein the superconductive elements are round wires.

4. The arrangement according to claim 1, wherein at least one direct current transmission element, composed of two phase conductors which are insulated relative to each other, is helically wound around an elongated support.

5. The arrangement according to claim 4, wherein the support is a solid strand.

6. The arrangement according to claim 4, wherein the support is a pipe.

* * * * *